United States Patent [19]

Golab et al.

[11] Patent Number: 4,724,485
[45] Date of Patent: Feb. 9, 1988

[54] TELEVISION SCANNING WITH IMPROVED RESOLUTION

[75] Inventors: Thomas J. Golab, Beltsville; Robert S. Ledley, Silver Spring, both of Md.

[73] Assignee: National Biomedical Research Foundation, Washington, D.C.

[21] Appl. No.: 913,165

[22] Filed: Sep. 29, 1986

[51] Int. Cl.[4] ............................................. H04N 7/01
[52] U.S. Cl. ....................................... 358/140; 315/399
[58] Field of Search ................ 358/140, 21 V, 11, 93, 358/148; 315/396, 397, 399, 408; 343/55 C

[56] References Cited

U.S. PATENT DOCUMENTS

| | | | |
|---|---|---|---|
| 3,136,847 | 6/1964 | Brown | 178/6.8 |
| 3,422,223 | 1/1969 | Scipione | 178/69.5 |
| 3,914,543 | 10/1975 | Kawahara et al. | 178/6.8 |
| 4,047,204 | 9/1977 | Gold | 358/93 |
| 4,099,179 | 7/1978 | Hofstein | 358/140 X |
| 4,331,980 | 5/1982 | Ryan | 358/217 |
| 4,349,839 | 9/1982 | McGinn | 358/148 |
| 4,364,090 | 12/1982 | Wendland | 358/140 |
| 4,365,270 | 12/1982 | Rutishauser | 358/140 |
| 4,498,106 | 2/1985 | Sato et al. | 358/213 |
| 4,506,298 | 3/1985 | Mansell et al. | 358/160 |
| 4,513,312 | 4/1985 | Takemura | 358/44 |
| 4,558,347 | 12/1985 | Pritchard et al. | 358/11 |
| 4,580,170 | 4/1986 | Levine | 358/213 |
| 4,602,273 | 7/1986 | Carlson | 358/11 |

Primary Examiner—James J. Groody
Assistant Examiner—Victor R. Kastak
Attorney, Agent, or Firm—Joseph G. Seeber

[57] ABSTRACT

Television (TV) scanning with improved resolution is obtained by implementation into a conventional TV scanning arrangement of a vertical drive signal modifying circuit which modifies vertical drive signals prior to their being provided as an input to the conventional TV scanning arrangement. Processing of the vertical drive signals results in the generation of various time delay signals which, when logically combined in accordance with the present invention, result in the generation of modified vertical drive signals. As a result of application of the modified vertical drive signals to the conventional TV scanner arrangement, the number of fields making up the conventional interlace pattern is multiplied by an integral factor greater than one.

12 Claims, 7 Drawing Figures

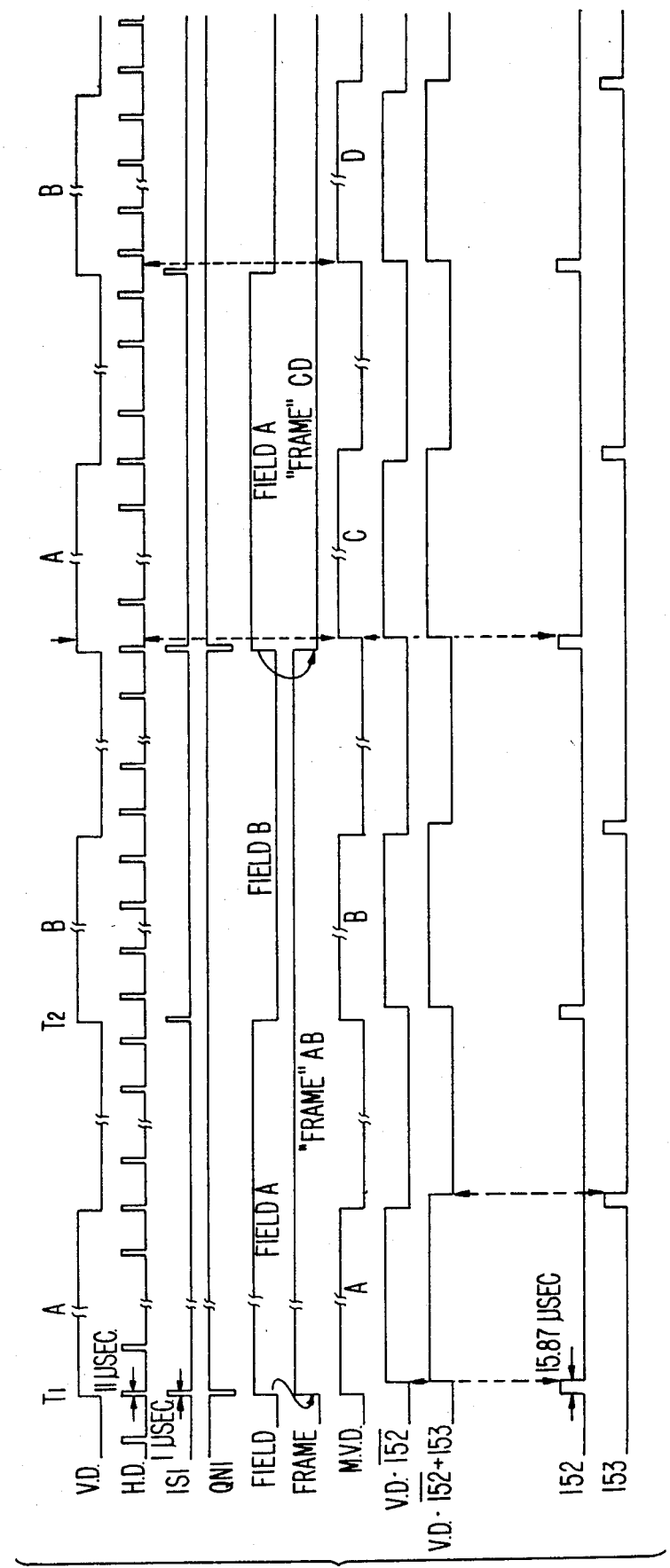

TELEVISION SCANNING WITH IMPROVED RESOLUTION

TECHNICAL FIELD

The present invention generally relates to television scanning with improved resolution, and more particularly to a vertical drive modifier circuit by means of which improved resolution in television scanning can be obtained.

BACKGROUND ART

Conventional commerical television (TV) cameras, specifically those of the vidicon type, generate a raster on the target by deflecting an electron beam horizontally at a fast rate (15,275 times per second) and vertically at a slower rate. In order to decrease flicker, prior art arrangements have produced an interlaced pattern of scanning.

As a result, conventional TV cameras obtain 525 lines of resolution by scanning half that number in a first field and an identical number in an interlaced second field. Precise positioning of the interlaced lines is accomplished by precise timing between the vertical drive signals and the horizontal drive signals.

In certain applications, such as in television viewing of a microscopically magnified image of an object, extremely good resolution—above and beyond that provided by coventional TV cameras—is required. Thus, the technology of the prior art is inadequate to provide such highly improved resolution, and there is a need in the prior art for an arrangement by means of which television scanning with highly improved resolution can be achieved.

In the latter regard, the following patents typify the prior art in this area of technology: U.S. Pat. Nos. 3,136,847; 3,422,223; 3,914,543; 4,331,980; 4,364,090; 4,498,106; 4,506,298; 4,513,312; 4,558,347; 4,580,170; and 4,602,273. None of these patents discloses a vertical drive modifier circuit as disclosed herein for performance of television scanning with improved resolution.

DISCLOSURE OF INVENTION

The present invention generally relates to an arrangement for achieving television scanning with improved resolution, and more particularly to a vertical drive modifier circuit by means of which the vertical drive signals conventionally generated can be modified so as to achieve greatly improved resolution in the resultant image or picture.

More specifically, in accordance with the invention, a vertical drive modifier circuit modifies the vertical drive signals otherwise conventionally generated so as to achieve a four-fold interlace pattern not previously produced by television cameras of the prior art. As a result of the invention, 1000 lines of resolution or more are obtained by an economical modification to the circuitry of the conventional TV camera.

Therefore, it is a primary object of the present invention to provide a TV scanning arrangement by means of which greatly improved resolution in the resultant image can be obtained.

It is an additional object of the present invention to provide a vertical drive modifier circuit which modifies the vertical drive signals generated within a TV camera so as to achieve highly improved resolution in the resultant picture.

The above and other objects, that will hereinafter appear, and the nature of the invention will be more fully understood by reference to the following detailed description, the appended claims, and the drawings.

BRIEF DESCRIPTION OF DRAWINGS

FIG. 7 is a timing diagram relating to the operation of the vertical drive modifier circuit of FIG. 6.

BEST MODE FOR CARRYING OUT THE INVENTION

The invention will now be described in more detail with reference to the various figures of the drawings.

Figure 1:
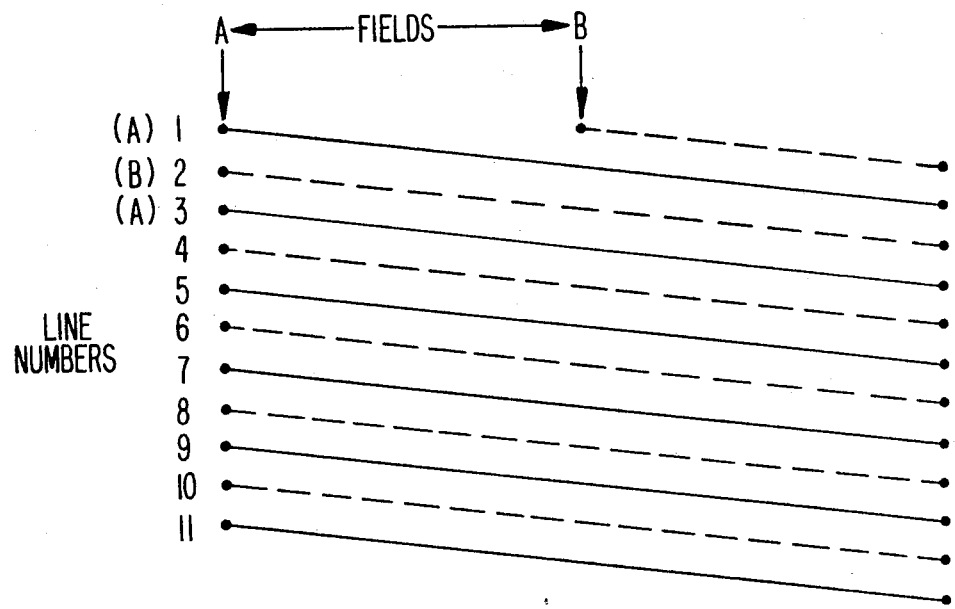
FIG. 1 is an illustration of a standard (double) interlace pattern generated by a conventional TV camera.

FIG. 1 is a graphical illustration of a standard (double) interlace pattern generated by a conventional TV camera. In FIG. 1, retrace time is neglected and not illustrated.

As mentioned previously, all commercial TV cameras of the prior art, specifically those of the vidicon type, generate a raster on the target by deflecting the electron beam horizontally at a fast rate (15,275 times per second) and vertically at a slower rate. In order to decrease flicker, an interlaced pattern as shown in FIG. 1 is used.

On the standard TV camera, 525 lines of resolution are obtained by scanning $262\frac{1}{2}$ lines of field A (the solid lines in FIG. 1) and $262\frac{1}{2}$ lines of interlaced field B (the dashed lines in FIG. 1).

Figure 2:
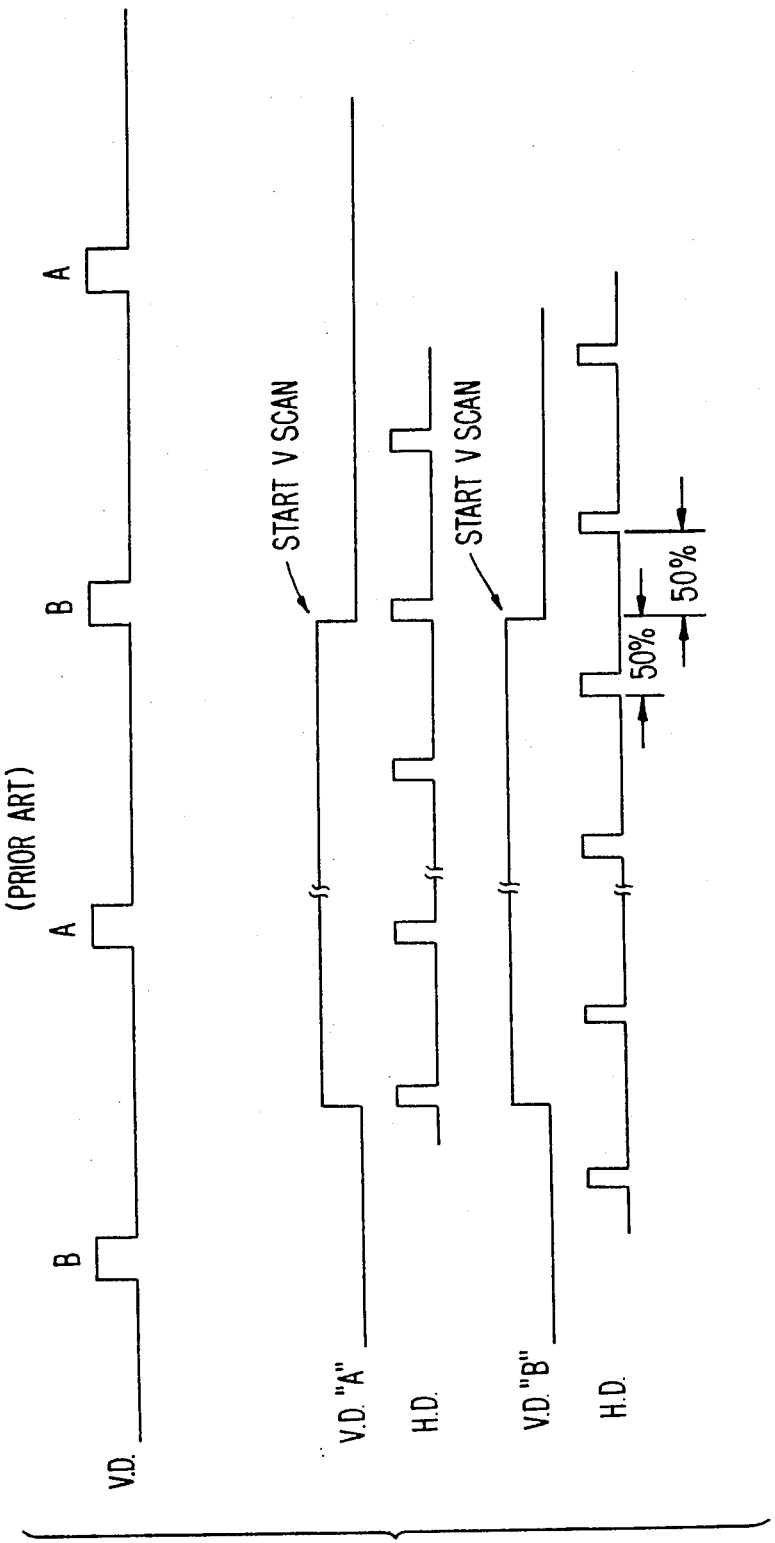
FIG. 2 is a series of timing diagrams relating to the timing of the vertical drive and horizontal drive signals for generating the standard interlace pattern of the prior art.

FIG. 2 is a timing diagram showing the relationship between vertical drive and horizontal drive signals or pulses, as generated in a conventional TV camera of the prior art so as to obtain the standard (double) interlace pattern of FIG. 1. As seen in FIG. 2, precise positioning of the interlace lines is accomplished by precise timing between the vertical drive (V.D.) signals and the horizontal drive (H.D.) signals shown in FIG. 2.

Figure 3:
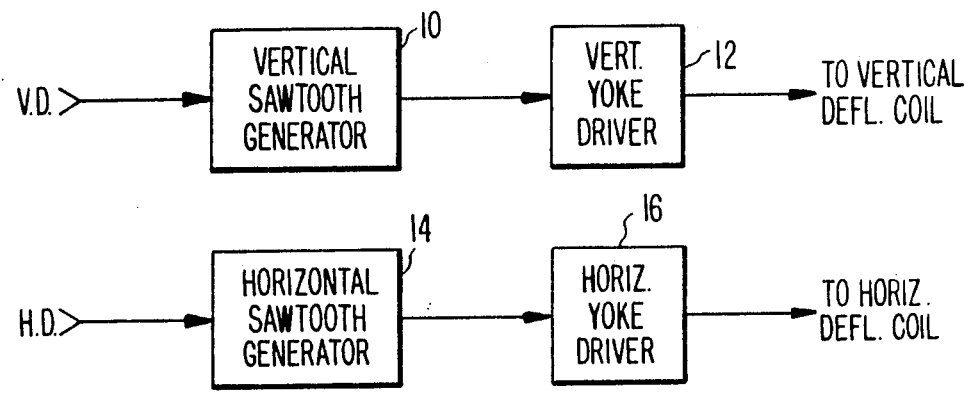
FIG. 3 is a block diagram of a standard arrangement for generating vertical drive and horizontal drive signals in a TV camera of the prior art.

FIG. 3 is a block diagram of a conventional arrangement for driving the vertical and horizontal deflection coils in a TV camera. Specifically, the vertical drive signals or pulses shown in the timing diagram of FIG. 2 are applied to a conventional sawtooth generator 10 which generates a sawtooth waveform which is applied to a vertical yoke driver circuit 12, the latter producing an output which drives a vertical deflection coil. Similarly, the horizontal drive signals or pulses are applied to a horizontal sawtooth generator 14 which generates a sawtooth waveform which is applied to a horizontal yoke driver circuit 16, the latter producing an output which is applied to the horizontal deflection coil. As mentioned above, the convetional arrangement results in the generation of 525 lines of resolution in the resultant image.

Figure 4:
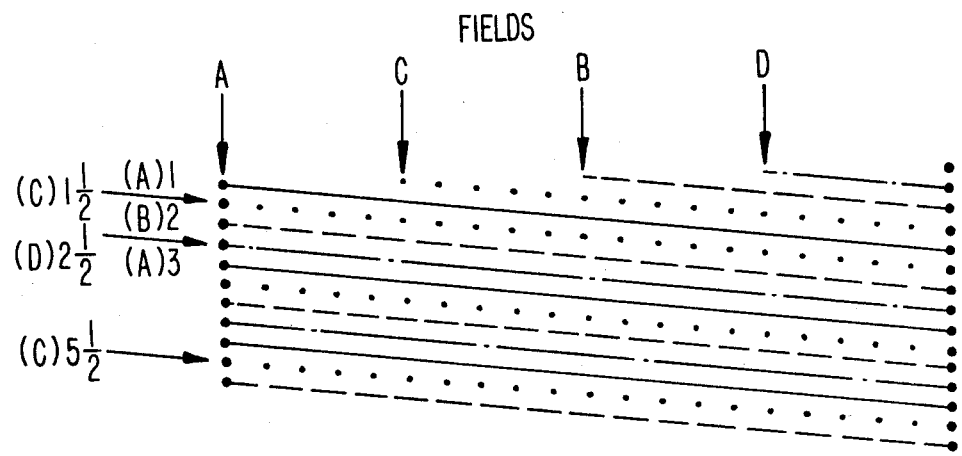
FIG. 4 is an illustration of a four-fold interlace pattern generated by a TV camera modified in accordance with the present invention.

FIG. 4 is an illustration of a four-fold interlace pattern achieved by the arrangement of the present invention. As indicated therein, the vertical drive modifier circuit of the present invention results in the production of 1050 lines of resolution. In FIG. 4, the solid lines A and the dashed lines B correspond to the standard raster lines which would be generated by a conventional arrangement, whereas the dotted lines C and the dash-dot lines D are the extra interlacing to obtain the significantly improved resolution. Precise spatial positioning of the interlace lines is accomplished by precise timing between the vertical drive and horizontal drive signals, and therefore it is necessary, in accordance with the present invention, to modify the vertical drive signal prior to its being used to generate output signals to be applied to the vertical deflection coil.

Figure 5:
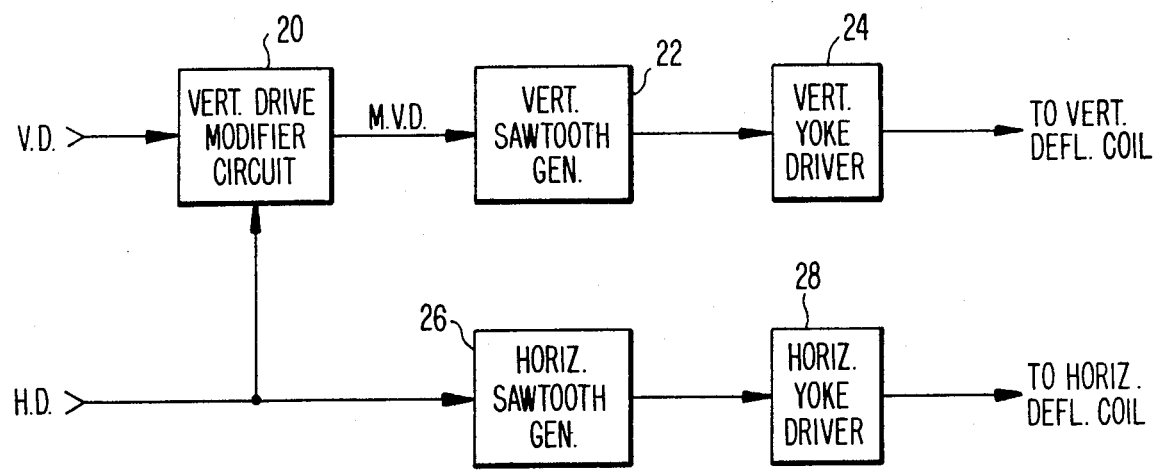
FIG. 5 is a block diagram of the inventive arrangement for generating a four-fold interlace pattern by modifying the circuitry of the TV camera.

FIG. 5 is a block diagram of the arrangement utilized in the present invention to generate output signals for driving the vertical and horizontal deflection coils. As seen therein, the arrangement comprises a vertical drive modifier circuit 20, vertical and horizontal sawtooth generators 22 and 26, respectively, and vertical and horizontal yoke driver circuits 24 and 28, respectively. As indicated in FIG. 5, the vertical drive (V.D.) signal is interrupted and applied to a vertical drive modifier circuit 20, and a modified vertical drive (M.V.D.) signal is applied to the vertical sawtooth generator 22. It should be noted that the vertical drive modifier circuit 20 also receives the horizontal drive (H.D.) signal, and uses it to generate the M.V.D. signal.

Figure 6:
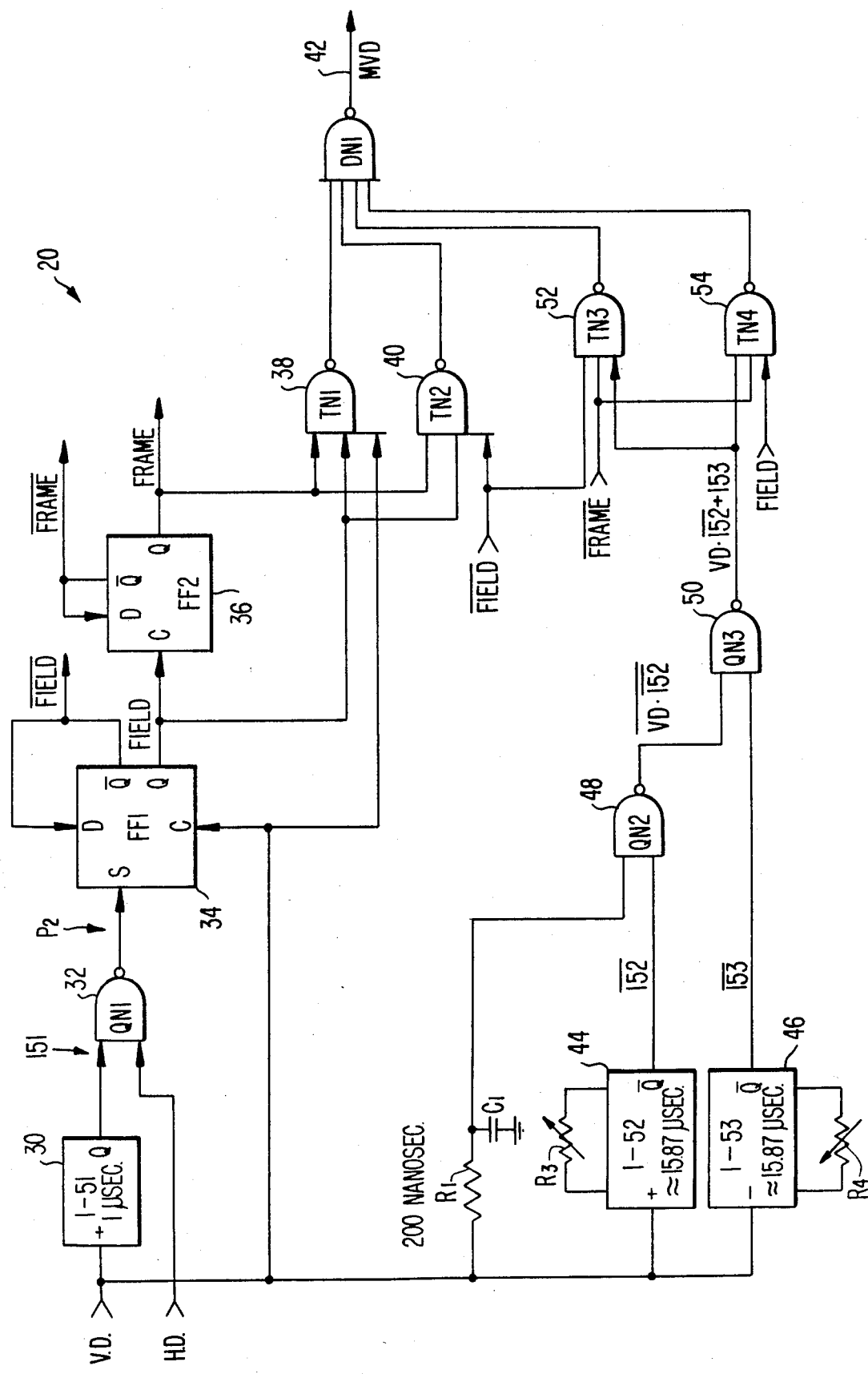
FIG. 6 is a detailed diagram of the vertical drive modifier circuit shown in FIG. 5.

FIG. 6 is a detailed diagram of the vertical drive modifier circuit 20 of FIG. 5. As seen therein, the vertical drive modifier circuit 20 comprises the following elements: one-shot devices 30, 44 and 46, flip-flops 34 and 36, and NAND gates 32, 38, 40, 42, 48, 50, 52 and 54, all connected as shown in FIG. 6.

FIG. 7 is a timing diagram relating to the operation of the modified vertical drive circuit 20 of FIG. 6, and should be used in conjunction with FIG. 6 in discussing the operation of the vertical drive modifier circuit 20 of FIG. 6.

Referring to FIGS. 6 and 7, the vertical drive (V.D.) signal is applied to the positive trigger of one-shot device 30, and as a result a one-microsecond pulse (or a pulse of an appropriately chosen width) 1S1 is applied to one input of NAND gate 32, the horizontal drive (H.D.) signal being applied to the other input of NAND gate 32 if such horizontal drive signal occurs. The two inputs are AND'ed in NAND gate 32 and the result is inverted to produce output P2, the latter being provided to the set input of flip-flop 34. The clock input of flip-flop 34 receives the vertical drive (V.D.) signal, but a set pulse applied by gate 32 to the set input of flip-flop 34 overrides any effect that the vertical drive input to the clock input of flip-flop 34 will have.

The output FIELD of flip-flop 34 is applied to the clock input of flip-flop 36 so that flip-flop 36 changes state on each leading edge of the output of flip-flop 34 (since the $\overline{Q}$ output of flip-flop 36 is connected to its D or data input).

When the vertical drive modifier circuit 20 is first turned on, flip-flop 36 can be in any state. However, within four vertical drive pulse times, the situation as shown at the left side of the timing diagram of FIG. 7 will be reached, and this is shown as the starting point T1 of operation of the modified vertical drive circuit 20 of FIG. 6.

When a horizontal drive pulse does not occur in coincidence with the leading edge of the vertical drive pulse, as is the case for the field B time T2 in FIG. 7, then the leading edge of the vertical drive pulse will change flip-flop 34 from a "one" state to a "zero" state, this being due to the fact that the $\overline{Q}$ output of flip-flop 34 is tied or connected to its data input D. It should be noted that flip-flop 34 could now function in accordance with the timing diagram of FIG. 7 even without the set input.

With the generation of two signals, FIELD from flip-flop 34 and FRAME from flip-flop 36, four possibilities or four unique events can occur: FIELD and FRAME, $\overline{FIELD}$ and FRAME, FIELD and $\overline{FRAME}$, and $\overline{FIELD}$ and $\overline{FRAME}$. The primary function of the vertical drive modifier circuit 20 of FIG. 6 is to obtain precise delays in the vertical drive pulses—specifically, the A and B pulses of FIG. 4—to get the C and D pulses necessary to create the four-fold interlace pattern of FIG. 4.

Referring again to FIG. 6, the vertical drive (V.D.) signal is applied to the positive trigger input of one-shot device 44 and to the negative trigger input of one-shot device 46. The output signals, $\overline{1S2}$ and $\overline{1S3}$, of the one-shot devices 44 and 46, respectively, are produced, and the corresponding non-inverted output signals 1S2 and 1S3 are shown in the timing diagram of FIG. 7. The precise timing of these signals is critical because it determines the interline spacing of the additional interlaced lines C and D shown in FIG. 4. Therefore, potentiometers R3 and R4 associated with one-shot devices 44 and 46, respectively, are used to obtain delays of precisely one-fourth of a horizontal scan line, an oscilloscope being used to make the proper adjustments to the potentiometers R3 and R4. An alternate method of obtaining output signals inverted 1S2 and 1S3 would be to use counters (not shown), if the camera is using an internal clock, to count the horizontal drive and vertical drive signals.

As indicated, the leading and trailing edges of the vertical drive (V.D.) signal are used to generate the outputs, $\overline{1S2}$ and $\overline{1S3}$, of one-shot devices 44 and 46, respectively, the latter outputs then being used to modify the vertical drive input pulses. Since some delay will be present in the outputs, $\overline{1S2}$ and $\overline{1S3}$, typically a thirty-nanosecond delay for standard one-shot devices, it is necessary to delay the vertical drive (V.D.) input signal before combining it with the one-shot signal outputs. A delay of greater than 150 nanoseconds (although the precise value is not critical) can be obtained by utilizing the RC circuit shown in FIG. 6, consisting of a resistor R1 (preferably of 100 ohms) and a capacitor C1 (preferably of 0.002 microfarads).

Further referring to FIG. 6, the output $\overline{1S2}$ of one-shot device 44 is AND'ed with the vertical drive (V.D.) input signal in NAND gate 48, and this identifies or marks off one-fourth of a line width from the leading edge of all of the vertical drive pulses, as shown in FIG. 7. This signal is then OR'ed (since both signals are inverted) with the output $\overline{1S3}$ of one-shot device 46 in NAND gate 50. This effectively extends the trailing edges of all vertical drive input pulses.

Referring to FIG. 7, the modified vertical drive (M.V.D.) signal is composed of the following: (1) the A pulse of the vertical drive signal during time FIELD·FRAME; (2) the B pulse of the vertical drive signal during time $\overline{\text{FIELD} \cdot \text{FRAME}}$; (3) the one-quarter line delayed A pulses (viz., V.D.·$\overline{1S2}$+1S3) during the time interval FIELD·FRAME; and (4) the B pulses (delayed by one-quarter of the line time) during the time interval $\overline{\text{FIELD} \cdot \text{FRAME}}$.

The complete logic equations for the modified vertical drive (M.V.D.) output of the vertical drive modifier circuit 20 of FIG. 6 are implemented in the four-legged NAND gate 42 and the three-legged NAND gates 38, 40, 52 and 54, respectively. These logic equations are as follows:

$$MVD = MVDA + MVDB + MVDC + MVDD$$

where
$$MVDA = VD \cdot \text{FIELD} \cdot \text{FRAME}$$

$$MVDB = VD \cdot \overline{\text{FIELD} \cdot \text{FRAME}}$$

$$MVDC = \overline{\text{FIELD} \cdot \text{FRAME}} \cdot (VD \cdot \overline{1S2} + 1S3)$$

$$MVDD = \overline{\text{FIELD} \cdot \text{FRAME}} \cdot (VD \cdot \overline{1S2} + 1S3).$$

If the camera employed in accordance with the present invention is externally driven, the vertical drive (V.D.) signal mentioned above will have been extracted from a composite sync signal by a conventional sync separator circuit (not shown). If external sync is not supplied to the camera, the vertical drive signal V.D. may be generated by use of an integrated circuit sync generator which uses an external clock and internal counters to count the horizontal and vertical times. In either case, the V.D. line to the vertical sawtooth generator of a conventional arrangement, as shown in FIG. 3, can easily be disconnected and the vertical drive modifier circuit 20 of FIG. 6 can be inserted in the V.D. input line prior to the vertical sawtooth generator 22 of FIG. 5. As stated previously, if the camera is synchronized interally, and if the master clock is accessible, the one-shot devices 44 and 46 of FIG. 6 can be replaced by precision counters which obviate the necessity to trim the one-shot times.

The preceding discussion implies that, having scanned the vidicon with twice as many lines, we will be able to display them on a monitor that has also been appropriately modified. In such case, the modified vertical drive (M.D.V.) signal can be buffered (in a buffer not shown, but connected to the output of the circuit of FIG. 6) and taken directly to the vertical sawtooth generator of the monitor (also not shown). This is a simpler modification since it merely requires disconnecting the old V.D. signal and connecting the already modified V.D. signal.

While preferred forms and arrangements have been shown in illustrating the invention, it is to be understood that the above-described arrangement may be modified without departing from the spirit and scope of this disclosure, and that the invention is limited only by the claims appended hereto.

We claim:

1. In a television scanning arrangement for scanning in accordance with an interlace pattern made up of a predetermined number of fields, said arrangement comprising:
   vertical drive signal generating means for generating vertical drive signals controlling the scanning in a vertical direction, and
   horizontal drive signal generating means for generating horizontal drive signals for controlling the scanning in a horizontal direction;
   a vertical drive signal modifying circuit for modifying the vertical drive signals to develop modified vertical drive signals for controlling the scanning in the vertical direction, said vertical drive signal modifying circuit comprising:
   timing signal generating means responsive to said horizontal drive signals and to said vertical drive signals for generating at least one timing signal,
   delay signal generating means responsive to said vertical drive signals for generating at least one delay signal defining an inter-line spacing between scan lines of said predetermined number of fields and adjacent scan lines of additional fields, and
   logic means responsive to said vertical drive signals, said at least one timing signal and said at least one delay signal for generating said modified vertical drive signals, whereby scanning in the vertical direction is carried out in accordance with a number of fields equal to the sum of said predetermined number of fields and said additional fields.

2. The circuit of claim 1, wherein said timing signal generating means comprises a field signal generating circuit for generating field signals, each of said field signals having a duration corresponding to a time duration of scanning of a respective one of said predetermined number of fields.

3. The circuit of claim 2, wherein said field signal generating circuit comprises a one-shot device responsive to said vertical drive signals for generating corresponding pulses of fixed duration, and NAND gate responsive to said pulses of fixed duration from said one-shot device and to said horizontal drive signals for generating an output pulse occurring at the beginning of scanning of a first one of said predetermined number of fields, and a flip-flop device having a set input for receiving said output pulse of said NAND gate and having a clock input for receiving said vertical drive signals, said flip-flop device being responsive thereto for generating said field signal.

4. The circuit of claim 2, wherein said timing signal generating means further comprises a frame signal generating circuit for generating a frame signal having a duration equal to the sum of the durations of the field signals corresponding to said predetermined number of fields.

5. The circuit of claim 4, wherein said frame signal generating circuit comprises a further flip-flop device having a clock input connected to receive said field signal from said flip-flop device, said further flip-flop device being responsive thereto for generating said frame signal.

6. The circuit of claim 1, wherein said delay signal generating means comprises at least one one-shot device responsive to said vertical drive signals for generating output pulses of fixed duration, said at least one one-shot device including a potentiometer having a resistance which can be varied so as to vary the timing of the output pulses of said at least one one-shot device, whereby to determine the interline spacing of the scan lines of said predetermined number of fields and the adjacent scan lines of said additional fields.

7. The circuit of claim 6, wherein said delay signal generating means comprises a first one-shot device producing a first output pulse and a second one-shot device producing a second output pulse.

8. The circuit of claim 7, wherein said delay signal generating means further comprises a NAND gate responsive to said vertical drive signals and to said first output pulse of said first one-shot device for producing a first logical output.

9. The circuit of claim 8, wherein said delay signal generating means comprises an additional NAND gate responsive to said first logical output of said NAND gate and to said second output pulse of said second one-shot device for producing a second logical output.

10. The circuit of claim 1, said logic means being responsive to said vertical drive signals, said at least one timing signal and said at least one delay signal for generating a plurality of logical output signals comprising said modified vertical drive signals, a first group of said logical output signals designating the beginning of scanning of said predetermined number of fields and a second group of said logical output signals designating the beginning of scanning of said additional fields.

11. The circuit of claim 10, wherein said at least one timing signal comprises a field signal and a frame signal, said logic means comprises a first set of NAND gates for receiving said vertical drive signals, said field signal and said frame signal, and a second set of NAND gates for receiving said at least one delay signal, said field signal and said frame signal.

12. The circuit of claim 11, wherein said logic means comprises a further NAND gate having inputs connected to outputs of said first set of NAND gates and said second set of NAND gates, said further NAND gate performing a logical OR operation with respect to its inputs, whereby to provide said modified vertical drive signals.

* * * * *